July 21, 1953   D. F. WINTER   2,646,503
BALANCED SWEEP CIRCUIT
Filed Nov. 29, 1945   2 Sheets-Sheet 1

INVENTOR
DAVID F. WINTER

BY

ATTORNEY

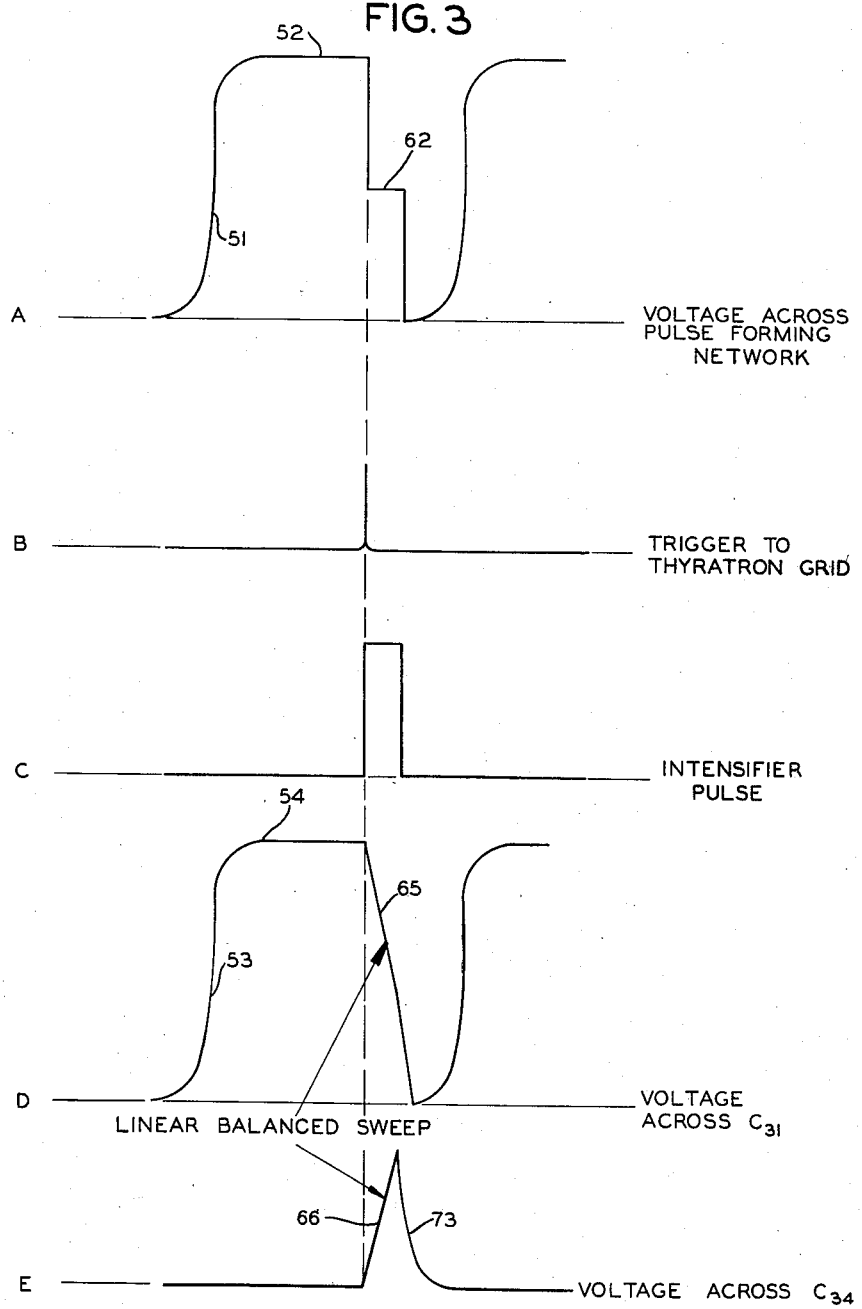

Patented July 21, 1953

2,646,503

UNITED STATES PATENT OFFICE 2,646,503

BALANCED SWEEP CIRCUIT

David F. Winter, Cambridge, Mass., assignor, by mesne assignments, to the United States of America as represented by the Secretary of the Navy Application November 29, 1945, Serial No. 631,754

7 Claims. (Cl. 250—27)

1

This invention relates in general to electric circuits and more particularly concerns a novel linear, balanced sweep circuit adaptable for use with high frequency oscilloscopes or synchroscopes.

The circuit comprising the principal object of the present invention is one phase of the development of cathode ray apparatus producing a photographic record and capable of an image time resolution of the order of $10^{-9}$ second or one millimicrosecond. It has been observed that resolution of this order is obtainable for normal size cathode ray equipment if the applied voltage sweep is linear and sufficiently rapid to produce a spot speed across the tube face of the order of 50 to 100 inches per microsecond.

Conventional cathode ray tubes are not applicable to the present development inasmuch as the electron transit time under the deflection plates is of the same order of time, $10^{-9}$ seconds, as it is desired to record. Thus the tube itself introduces considerable distortion at 1000 megacycles. A further limitation to the use of these tubes is the lack of sufficient fluorescent spot intensity to record effectively the aforementioned high speed spot needed to resolve detail at the high frequencies. The specialized design and construction of a cathode ray tube having the desired electrical characteristics form no part of the present invention and will not be discussed. However, a problem, in addition to those presented by the cathode ray tube requirements is the attainment of suitable sawtooth sweep voltages for application to the tube deflecting plates. Heretofore, sweep circuits have been incapable of the generation of voltages for driving a screen spot at speeds over five inches per microsecond and without considerable non-linear distortion. This invention therefore contemplates and has as a primary object the provision of a high speed, linear, balanced sweep voltage suitable for high frequency cathode ray oscilloscopes.

Another object of the present invention is to provide a sweep circuit for a cathode ray tube generating, during the course of the sweep, a substantially rectangular, high intensity pulse for use as a cathode ray beam intensifier signal.

The sawtooth sweep voltage generator and the rectangular pulse generator are simultaneously triggered. It is thus a further object of this invention to provide a single electron switch tube circuit for initiating when triggered, both sweep and intensifier circuits.

These and other objects of the present invention will now become apparent from the following detailed specification taken in connection with the accompaying drawings, in which:

Fig. 3 is a graphical representation of the voltage wave forms connected with the circuits of Fig. 2.

Figure 1:
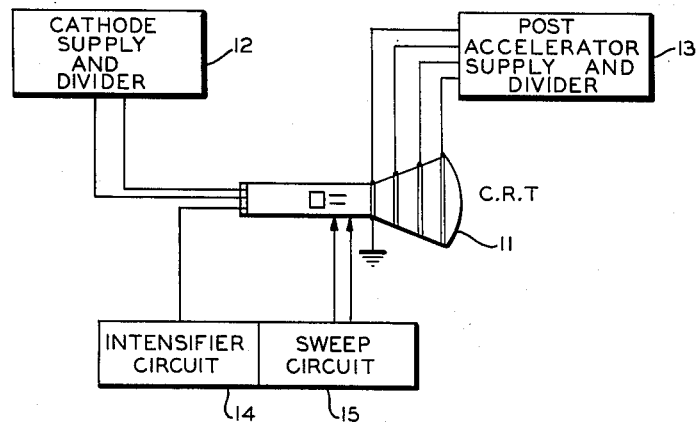
Fig. 1 is a block diagram of the novel high frequency oscilloscope.

The basic elements required for the novel ultrahigh frequency oscilloscope are substantially those required for more conventional types. Referring now to Fig. 1, there is illustrated a cathode ray tube 11, which incorporates the special high frequency design requirements hereinabove discussed. The cathode ray tube 11 is energized first by a cathode power supply 12, which includes the voltage divider networks required for electron gun potentials, and second by a post-accelerator power supply 13 which includes a voltage divider for supplying suitable potentials to the plurality of cathode ray tube high voltage accelerating rings. Also illustrated in Fig. 1 are the intensifier and high speed sweep circuits 14 and 15, respectively. The intensifier circuit provides a high intensity, substantially constant and rectangular voltage impulse for the control grid of the cathode ray tube 11. Inasmuch as the image appearing upon the cathode ray tube fluorescent screen is photographically recorded, the intensifier pulse is required to provide the high intensity spot illumination such that ordinary photographic film will be sufficiently sensitive to respond during the short sweep time encountered. The sweep circuit 15 provides in its output the linearly varying potentials required to sweep the beam across the face of the cathode ray tube at the desired speed. The sweep potentials are balanced, that it to say, the potential of one plate linearly rises while the potential of the oppositely disposed deflecting plate linearly falls at a corresponding rate.

Figure 2:
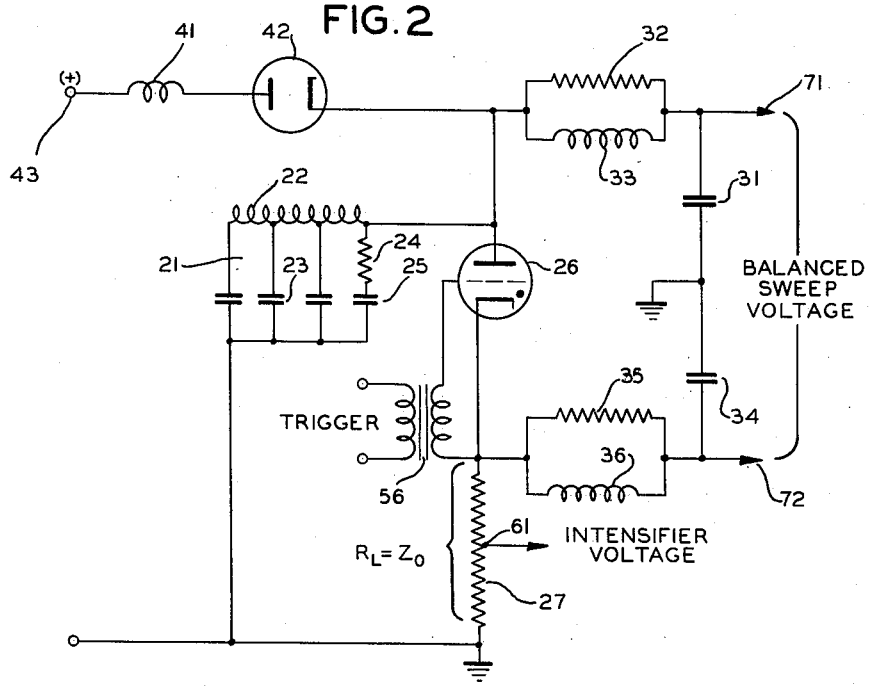
Fig. 2 is a schematic circuit diagram of the high speed sweep and intensifier circuits.

The present invention effectively combines the intensifier and sweep circuits 14 and 15 and for a discussion thereof reference is now made to Fig. 2. The basic elements of this circuit comprise essentially a pulse forming network 21 which, as is well understood in the art, may comprise a suitably designed artificial line, including series inductive elements 22 and shunt capacitive elements 23. For the purpose of generating an output voltage pulse having rapid rise and fall, that is, steep leading and trailing edges, the pulse forming network 21 is terminated by the series combination of resistor 24 and capacitor 25.

A thyratron switch tube 26 isolates when non-conductive or deenergized the pulse forming network 21 from a load impedance 27 which is preferably a resistance equal to the characteristic impedance of the pulse forming network 21. As illustrated, the pulse forming network 21 is connected to the plate of the thyratron 26 and the load impedance 27 is in series with the cathode thereof. Shunted across the pulse forming network 21 is a sweep impedance network, which for the embodiment, Fig. 2, comprises essentially a capacitor 31 in series with the parallel combination of resistor 32 and inductor 33. A corresponding sweep impedance network comprising capacitor 34 in series with the parallel combination of resistor 35 and inductor 36 is shunted directly across the pulse-forming network load impedance 27.

In operation of the novel circuit illustrated in Fig. 2, the pulse forming network 21 and the sweep capacitor 31 are "D. C. resonant charged" through the agency of an inductor 41 and a "hold-off" diode rectifier 42 having its plate connected to the inductor 41 and cathode to the plate of thyratron switch tube 26.

Briefly, D. C. resonant charging is based upon the fact that the application of a D. C. potential to a lossless, series resonant circuit will result in an alternating potential across the capacitor thereof having a peak voltage of theoretically twice the magnitude of the applied D. C. potential. In Fig. 2 a positive potential is continuously applied at terminal 43 and inductor 41 is employed to series resonate the capacitance of the pulse forming network and the capacitor 31.

Fig. 3a represents the voltage across the pulse forming network as a function of time. The application of a positive voltage at terminal 43 results, due to the series resonant nature of the circuit, in a substantially sinusoidal variation 51 cross the pulse forming network, rising to a peak 52. The reversal of this potential is precluded by the series diode 42 and accordingly the potential across the pulse forming network 21 remains at the peak value 52. This peak voltage is somewhat less than twice the supply voltage at terminal 43 due to the inherent losses of the circuit.

Fig. 3d represents the potential variation across the capacitor 31 as a function of time. During the charging period the voltage 53 and the peak voltage 54 are substantially as illustrated for the pulse forming network, Fig. 3a. The circuit components 21 and 31 of Fig. 2 remain charged until it is desired to initiate the sweep and record an image. This is accomplished by the application of a sharp positive trigger potential, Fig. 3b between the control grid and cathode of the thyratron 26. This trigger pulse is most effectively applied through transformer 56. The application of the positive trigger, Fig. 3b, to the grid of the thyratron 26 will render conductive the thyratron switch tube 26 and thus connect the pulse forming network 21 to the matched load 27. In accordance with the operation of such pulse forming networks, a substantially rectangular pulse of voltage will appear across the load resistor 27 for the discharge time of the network 21, which is twice the equivalent electrical length of the line. The voltage wave form appearing across the load impedance 27 is illustrated in Fig. 3c. A tap 61 is provided upon the load impedance 27 from which point an intensifier voltage of the desired magnitude is taken and applied to the cathode ray tube as illustrated in Fig. 1. As previously mentioned, the resistor 24 and capacitor 25 are utilized to increase the steepness of the leading edge voltage rise so that cathode ray beam intensification is initiated immediately upon the discharge of the pulse forming network 21.

During the period of pulse forming network discharge, the voltage across the network appearing at the plate of switch tube 26 drops to one-half of the peak voltage 52 acquired during charge. This half voltage condition is illustrated at 62, Fig. 3a. The potential of the pulse forming network 21 falls to zero immediately after the complete discharge thereof. During the period of network discharge, the capacitor 31 which had previously been charged to the peak voltage 54, equal to the peak voltage appearing across the pulse forming network 21, now discharges to one-half that peak voltage which appears at the plate of thyratron 26. This discharge to the one-half potential point is graphically illustrated at 65, Fig. 3d. Simultaneously, during the period of network discharge the capacitor 34 which has previously been fully discharged now charges toward the potential across the load impedance 27, which because of the negligible drop across thyratron 26, is substantially equal to one-half the peak pulse forming network potential 52. This rise in potential across capacitor 34 is graphically illustrated at 66, Fig. 3e. The fall in potential across capacitor 31 and the corresponding rise in potential across capacitor 34 is utilized to provide at terminals 71 and 72 sweep potentials balanced to ground, for application to the deflecting plates of the cathode ray tube 11 illustrated in Fig. 1.

Immediately upon the termination of the pulse network discharge, the potential across the pulse forming network 21 and the sweep capacitor 31 falls to zero. In a like manner, capacitor 34 discharges as illustrated at 73, Fig. 3e. As soon as the switch tube 26 is rendered non-conductive, the D. C. resonant circuit, hereinabove described, functions to recharge capacitor 31 and pulse forming network 21 to the peak potential 52 to provide intensifier and high speed sweep potentials when triggered once again.

To obtain a balanced sweep at terminals 71 and 72, the corresponding elements of the impedance networks, that is, capacitors 31 and 34, resistors 32 and 35, and inductors 33 and 36, are preferably made equal. The omission of inductors 33 and 36 will provide an output sweep at terminals 71 and 72 which will be non-linear due to the normal exponential charge and discharge curves of capacitors through resistors. However, sufficient linearity may still be obtained by utilizing a charging potential at terminal 43 which is large compared to the required sweep potential. The addition of inductors 33 and 36 greatly improves the output linearity of the sweep circuit. A theoretical analysis has indicated that maximum linearity will be obtained if the circuit constant K falls between 0.7 and 0.9, where;

$$K = \frac{L_{33}}{(R_{32})^2 (C_{31})}$$

The rate of change of potential appearing between terminals 71 and 72 determines the sweep speed for a particular cathode ray tube. This factor is in turn dependent upon the design constants of the sweep impedance networks 31, 32, 33, and 34, 35, 36.

Summarizing, the circuit illustrated in Fig. 2 provides for an oscilloscope of the general type illustrated in Fig. 1, a substantially linearly varying balanced sweep voltage for one set of deflecting plates and a synchronized, constant amplitude intensifier pulse for the electron beam thereof. These potentials are obtained from a circuit utilizing a single switch tube for the operation thereof.

The particular circuits herein illustrated and described are subject to considerable modification dependent upon the application thereof. Thus, although the circuit illustrated is particularly adaptable to ultra high frequency oscilloscopes a suitable variation of the circuit constants will provide linear, slow speed sweeps for conventional oscillograph studies. Other possible variations include substitutions for the line type pulse forming network 21 and the gas thyratron switch tube 26.

Thus since numerous modifications and extensions of the principles hereinabove disclosed may become apparent to those skilled in the art, I prefer to be bound not by these specified disclosures but by the spirit and scope of the appended claims.

What is claimed is:

1. In an oscilloscope circuit means for simultaneously generating substantially linear, balanced sweep voltages and a substantially rectangular intensifier pulse voltage, comprising in combination a pulse forming network, a switch tube, means operative upon the denergization of said switch tube for charging said pulse forming network, means operative upon the energization of said switch tube for discharging said pulse forming network into a load impedance, said impedance being matched to the impedance of said pulse forming network, a first capacitor substantially linearly chargeable to the voltage across said pulse forming network, a second capacitor substantially linearly chargeable to the voltage across said load impedance, said sweep voltages being taken from said first and second capacitors, said intensifier pulse being taken from said load impedance.

2. In an oscilloscope circuit means for simultaneously generating substantially linear balanced sweep voltages and a substantially rectangular intensifier pulse voltage, comprising in combination a pulse forming network of predetermined electrical length, an impedance load substantially equal to the characteristic impedance of said pulse forming network, a thyratron switch tube normally deenergized and isolating said pulse forming network from said impedance load, a first capacitor in series with a first resistor shunting said pulse forming network, a second capacitor in series with a second resistor shunting said impedance load, means operative upon the deenergization of said thyratron for charging said pulse forming network and said first capacitor to a predetermined potential, means for rendering conductive said thyratron switch tube and discharging said pulse forming network into said load impedance, said first capacitor discharging substantially linearly during said pulse forming network discharge toward substantially one-half of said predetermined potential, said second capacitor charging substantially linearly during said pulse forming network discharge toward substantially one-half of said predetermined potential.

3. In a circuit for simultaneously generating linear balanced sweep voltages and a substantially rectangular intensifier voltage pulse for a cathode ray tube oscilloscope, a pulse forming network, a load impedance substantially equal to said network characteristic impedance, means for charging said network, and means for connecting said charged pulse forming network for discharge through said load impedance, and a storage capacitor in series with a resistor shunting said load impedance, whereby said storage capacitor is charged substantially linearly during the discharge of said pulse forming network.

4. In a circuit for simultaneously generating linear balanced sweep voltages and a substantially rectangular intensified voltage pulse for a cathode ray tube oscilloscope, a pulse forming network, a first capacitor, a load impedance matching the impedance of said network, a second capacitor, a switch tube, means operative upon the deenergization of said switch tube for charging said network and said first capacitor, and means operative to energize said switch tube for discharging said network into said load impedance thereby producing a substantially rectangular voltage pulse across said load impedance, and means for linearly charging said second capacitor from said voltage pulse across said load impedance during the period of discharge of said pulse forming network.

5. In an oscilloscope circuit, means for simultaneously generating substantially linear balanced sweep voltages and a substantially rectangular intensifier voltage pulse for application to a cathode ray tube, comprising in combination a pulse forming network of predetermined electrical length, an impedance load substantially equal to the characteristic impedance of said pulse forming network, a thyratron switch tube normally deenergized and isolating said pulse forming network from said impedance load, a first capacitor in series with a first resistor shunting said pulse forming network, a second capacitor in series with a second resistor shunting said impedance load, means operative upon the deenergization of said thyratron for charging said pulse forming network and said first capacitor to a predetermined potential, means for rendering conductive said thyratron switch tube and discharging said pulse forming network into said impedance load, thereby producing a substantially rectangular voltage pulse across said impedance load, said first capacitor discharging substantially linearly during said pulse forming network discharge toward substantially one-half of said predetermined potential, and said second capacitor charging substantially linearly during said pulse forming network discharge toward substantially one-half of said predetermined potential, thereby generating substantially linear balanced sweep voltages simultaneously with the generation of said substantially rectangular voltage pulse.

6. In a circuit for simultaneously generating linear sweep voltages and a substantially rectangular intensifier voltage pulse for a cathode ray tube, a pulse forming network, a first capacitor, a load impedance substantially matched to said network impedance, means for charging said network and said capacitor to a predetermined potential, means for periodically connecting said charged network for discharge through said impedance load, said capacitor linearly discharging during said network discharge toward said load impedance potential, and a second capacitor connected for linearly charging during said network discharge toward said load impedance potential.

7. An electrical circuit comprising a pulse forming network, a load impedance substantially equal to said network characteristic impedance, a first capacitor in series with a first resistor shunted across said network, a second capacitor in series with a second resistor shunted across said load impedance, means for charging said pulse forming network and said first capacitor, and means for periodically connecting said charged pulse forming network for discharge through said load impedance, said first and second capacitors providing during the period of said pulse forming network discharge substantially linearly varying potentials of opposite slope.

DAVID F. WINTER.

References Cited in the file of this patent

UNITED STATES PATENTS

| Number | Name | Date |
|---|---|---|
| 2,105,902 | Cawein | Jan. 18, 1938 |
| 2,118,352 | Lewis | May 24, 1938 |
| 2,227,076 | Geiger | Dec. 31, 1940 |
| 2,254,344 | Andrieu | Sept. 2, 1941 |
| 2,345,668 | Hallmark | Apr. 4, 1944 |
| 2,368,448 | Cook | Jan. 30, 1945 |
| 2,444,782 | Lord | July 6, 1948 |
| 2,467,793 | Wheeler | Apr. 19, 1949 |
| 2,522,957 | Miller | Sept. 19, 1950 |